US010481845B2

(12) United States Patent
Itou

(10) Patent No.: US 10,481,845 B2
(45) Date of Patent: Nov. 19, 2019

(54) IMAGE PROCESSING APPARATUS, IMAGE PROCESSING METHOD, AND PROGRAM

(71) Applicant: KONICA MINOLTA, INC., Chiyoda-ku, Tokyo (JP)

(72) Inventor: Jun Itou, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/156,433

(22) Filed: Oct. 10, 2018

(65) Prior Publication Data
US 2019/0138254 A1 May 9, 2019

(30) Foreign Application Priority Data
Nov. 8, 2017 (JP) .................................. 2017-215530

(51) Int. Cl.
G06K 15/00 (2006.01)
G06F 3/12 (2006.01)
H04N 1/00 (2006.01)
(52) U.S. Cl.
CPC ............ *G06F 3/1234* (2013.01); *G06F 3/121* (2013.01); *H04N 1/00047* (2013.01); *H04N 1/00084* (2013.01)
(58) Field of Classification Search
None
See application file for complete search history.

(56) References Cited

U.S. PATENT DOCUMENTS

| 2014/0226177 A1* | 8/2014 | Shijoh | H04N 1/444 |
| | | | 358/1.14 |
| 2014/0341437 A1* | 11/2014 | Araki | G06T 7/001 |
| | | | 382/112 |
| 2015/0078627 A1* | 3/2015 | Fukase | G06T 7/001 |
| | | | 382/112 |
| 2015/0131116 A1* | 5/2015 | Sochi | H04N 1/00917 |
| | | | 358/1.14 |
| 2019/0003985 A1* | 1/2019 | Yamazaki | B41F 33/0036 |
| 2019/0132454 A1* | 5/2019 | Fukase | H04N 1/00045 |

FOREIGN PATENT DOCUMENTS

| JP | 2014178282 A | 9/2014 |
| JP | 2015118050 A | 6/2015 |

* cited by examiner

*Primary Examiner* — Dov Popovici
(74) *Attorney, Agent, or Firm* — Buchanan Ingersoll & Rooney PC

(57) ABSTRACT

An image processing apparatus includes: an input part that acquires image data for an image forming part to perform image formation; an image reader disposed in a stage after a conveyance path for a paper sheet on which an image is formed by the image forming part; and an inspection processor that conducts inspection by comparing an image to be inspected with an image read by the image reader, wherein, after a defect is detected in the image read by the image reader, when a defect at the same portion is again detected from an image read by the image reader from a paper sheet subjected to recovery reprinting at the image forming part, the inspection processor performs image correction on a defect at the portion in image data for recovery re-reprinting in which the image forming part performs image formation.

11 Claims, 11 Drawing Sheets

IMAGE PROCESSING APPARATUS, IMAGE PROCESSING METHOD, AND PROGRAM

The entire disclosure of Japanese patent Application No. 2017-215530, filed on Nov. 8, 2017, is incorporated herein by reference in its entirety.

BACKGROUND

Technological Field

The present invention relates to an image processing apparatus, an image processing method, and a program for forming an image on a paper sheet, and more particularly, to a technology for inspecting a formed image.

Description of the Related Art

When an image is formed on a paper sheet by an image forming apparatus, an image quality defect occurs due to various process factors such as exposure, transfer, and fixing. Conventionally, to prevent image quality defects due to process factors, circuits that perform image correction are integrated into an integrated circuit that improves quality in a highly sophisticated manner. Where the thus developed integrated circuit is used in image forming apparatuses of various models, however, it is difficult for the integrated circuit to perform image correction while thoroughly supporting all the process conditions (such as toner, photosensitive members, development and transfer) unique to each model, the printing speed conditions, and ambient temperature. Therefore, a defect appears at a specific portion in an image in some cases.

A defect in an image printed by an image forming apparatus can be detected with an image reader disposed in the conveyance path for printed images, for example. When a defect is detected, recovery printing is performed to reprint the same image. However, in a case where an image defect is caused due to the model of the image forming apparatus, the same defect appears again even after recovery printing is performed under the same conditions. As a result, a high-quality product cannot be produced.

Known conventional image inspection methods are disclosed in JP 2015-118050 A and JP 2014-178282 A, for example.

JP 2015-118050 A discloses a configuration in which an inspection device is connected to an image forming system, and the inspection device detects an image defect by comparing the original image to be formed with an image read by an image reader of the inspection device. The inspection device disclosed in JP 2015-118050 A is designed to stop the formed image output in a case where image defects are detected from consecutive pages as a result of comparison between a read image and the inspection image on a page-by-page basis.

Meanwhile, JP 2014-178282 A discloses a technique for determining whether to stop printing, by estimating the probability that a defective image is again output after reprinting, in accordance with the past defect occurrence rate, at the time of reprinting of an image from which a defect has been detected through comparison between a read image and an inspection image.

As disclosed in JP 2015-118050 A and JP 2014-178282 A, an inspection device is installed so that measures such as reprinting can be taken in a case where an image defect unexpectedly appears. In a case where the same image defect repeatedly appears, however, the only measure that can be taken is to stop the printing. Moreover, after the printing is stopped, the user needs to perform the operation to eliminate the cause of the image defect, which requires extremely troublesome and time-consuming adjustment.

SUMMARY

An object of the present invention is to provide an image processing apparatus, an image processing method, and a program capable of appropriately coping with highly reproducible image defects.

To achieve the abovementioned object, according to an aspect of the present invention, an image processing apparatus reflecting one aspect of the present invention comprises an input part that acquires image data for an image forming part to perform image formation; an image reader disposed in a stage after a conveyance path for a paper sheet on which an image is formed by the image forming part; and an inspection processor that conducts inspection by comparing an image to be inspected with an image read by the image reader, wherein, after a defect is detected in the image read by the image reader, when a defect at the same portion is again detected from an image read by the image reader from a paper sheet subjected to recovery reprinting at the image forming part, the inspection processor performs image correction on a defect at the portion in image data for recovery re-reprinting in which the image forming part performs image formation.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one embodiment (hereinafter referred to as "this example") of the present invention will be described with reference to the drawings. However, the scope of the invention is not limited to the disclosed embodiments.

1. Example System Configuration

Figure 1:
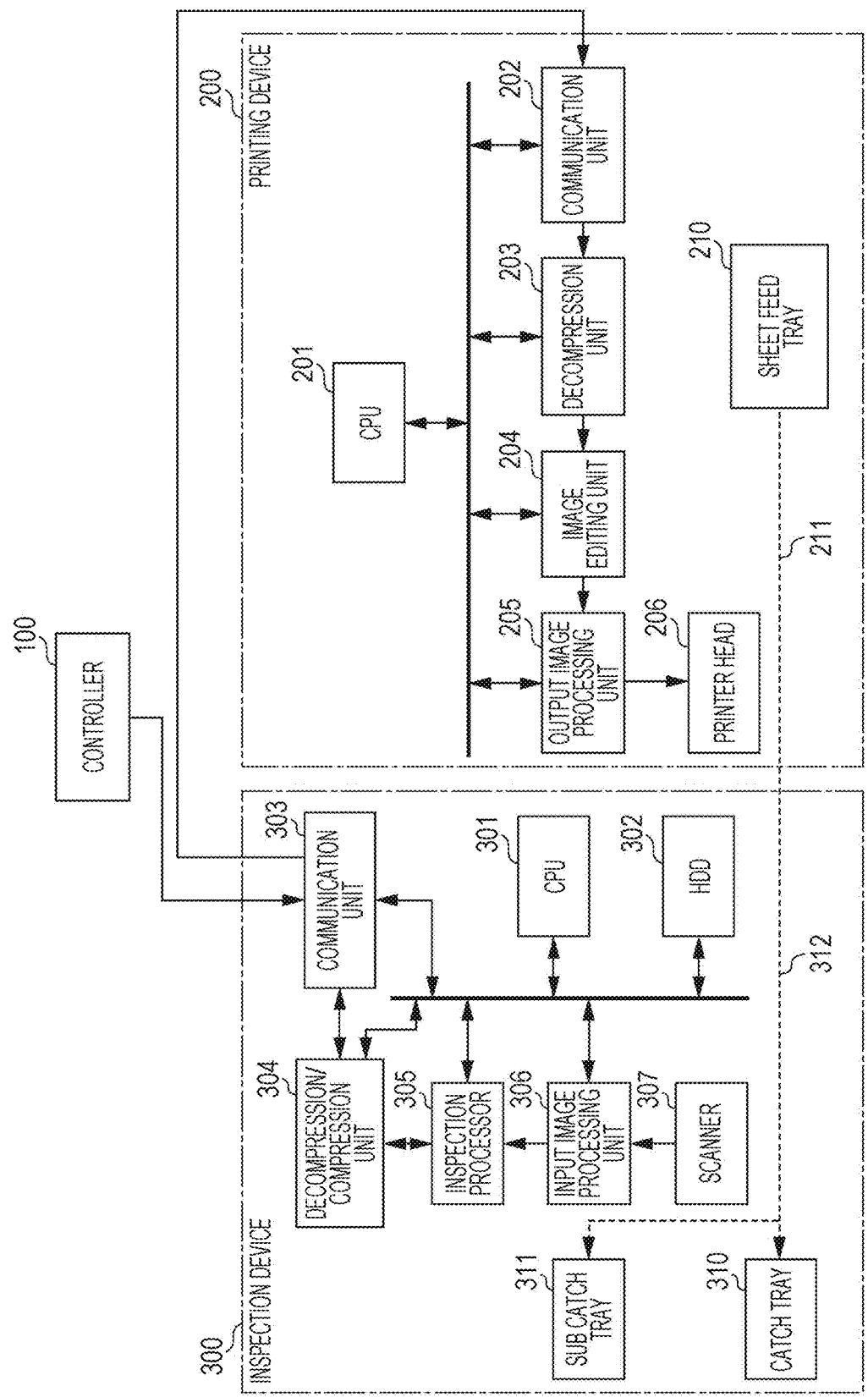
FIG. 1 is a configuration diagram showing an example system configuration according to an embodiment of the present invention.

FIG. 1 shows an example configuration of an entire image forming system of this example.

The image forming system of this example includes: a controller 100 that controls an entire image forming operation; a printing device 200 that forms an image on a paper sheet under the control of the controller 100; and an inspection device 300 that inspects the image formed on the paper sheet by the printing device 200.

The controller 100 is formed with a computer device that controls the image forming operation, acquires image data for forming an image at the printing device 200, and causes the printing device 200 to perform image formation based on the acquired image data. The controller 100 is communicably connected to the printing device 200 and the inspection device 300, and so that image data and control data can be transmitted from the controller 100. In the image forming system of this example, image data to be used in printing is transmitted from the controller 100 to the printing device 200 via the inspection device 300. Although FIG. 1 shows this image data transmission path, other data such as control data can be transmitted from the controller 100 directly to the printing device 200.

The printing device 200 includes a central control unit (hereinafter referred to as the "CPU") 201, a communication unit 202, a decompression unit 203, an image editing unit 204, an output image processing unit 205, a printer head 206, and a sheet feed tray 210.

The CPU 201 controls the image forming operation of the printing device 200. The communication unit 202 communicates with the controller 100 and the inspection device 300, to acquire image data and control data. In this example, the image data to be acquired by the communication unit 202 is data obtained by compressing rasterized image data, and is acquired from the inspection device 300.

The decompression unit 203 performs a decompression process on the image data acquired by the communication unit 202, and supplies the decompressed image data to the image editing unit 204.

The image editing unit 204 performs an editing process on the supplied image data as necessary, and supplies the edited (or unedited) image data to the output image processing unit 205.

The output image processing unit 205 outputs the image data supplied from the output image processing unit 205 to the printer head 206 that is the image forming part.

The printer head 206 performs an image forming process on a paper sheet in accordance with the supplied image data.

Here, the printer head 206 forms an image on a paper sheet conveyed from the sheet feed tray 210 through a conveyance path 211.

The paper sheet on which the image formation is performed by the printer head 206 is then conveyed to the inspection device 300.

The inspection device 300 includes a CPU 301, a hard disk drive (hereinafter referred to as the "HDD") 302, a communication unit 303, a decompression/compression unit 304, an inspection processor 305, an input image processing unit 306, a scanner 307, a catch tray 310, and a sub catch tray 311.

The CPU 301 controls an inspection operation in the inspection device 300.

The image data to be inspected and the data necessary for inspection are stored in the HDD 302. The data for machine learning that will be described later is also stored in the HDD 302.

The communication unit 303 receives the image data and the control data transmitted from the controller 100. The communication unit 303 also transmits the image data to the printing device 200. Accordingly, the communication unit 303 is equivalent to an image data input unit and an image data output unit, and an image data acquisition process and an image data transmission process are performed by the communication unit 303.

The decompression/compression unit 304 performs a decompression process on the image data transmitted from the controller 100 to the inspection device 300, and also performs a compression process on the image data to be transmitted from the inspection device 300 to the printing device 200.

The image data decompressed by the decompression/compression unit 304 is supplied to the inspection processor 305.

The scanner 307 is an image reader that performs an image reading process to read the image from a paper sheet on which the image has been formed by the printing device 200. The scanner 307 is disposed in the middle of a conveyance path 312 through which paper sheets are conveyed from the printing device 200, and reads an image from a paper sheet on which the image has been formed by the printing device 200. The image data read by the scanner 307 is supplied to the input image processing unit 306.

The input image processing unit 306 performs an input process that uses the image data read by the scanner 307 as comparative image data. The image data subjected to the input process by the input image processing unit 306 is supplied to the inspection processor 305

The inspection processor 305 compares the image data for image formation transmitted from the controller 100 with the image data read by the scanner 307 and supplied from the input image processing unit 306, and performs an inspection process to determine the presence/absence of a defect in the read image. Although the inspection process to be performed by the inspection processor 305 will be described later in detail, the inspection processor 305 performs a correction process on the image data for image formation in a case where the same image defect is detected in more than one inspection process. The decompression/compression unit 304 then performs a compression process on the image data subjected to the correction process, and supplies the resultant image data from the communication unit 303 to the printing device 200. In a case where the inspection processor 305 does not perform any image correction process, on the other hand, the inspection processor 305 causes the decompression/compression unit 304 to compress the image data for image formation transmitted from the controller 100 without any correction, and supplies the compressed image data from the communication unit 303 to the printing device 200.

Further, in a case where a defect is detected by the inspection conducted the inspection processor 305, and a correction process is performed, the image data subjected to the correction process is stored as sample training data for machine learning into the HDD 302.

Note that a paper sheet conveyed from the printing device 200 to the inspection device 300 is conveyed to the catch tray 310 via the conveyance path 312. However, a paper sheet from which a defect is detected by the inspection processor 305 is conveyed to the sub catch tray 311. Further, in a case where a defect is detected by the inspection processor 305, the paper sheets remaining in the conveyance path 211 in the printing device 200 and in the conveyance path 312 in the inspection device 300 are conveyed to the sub catch tray 311 at the point of time when the defect is detected.

2. Outlines of Image Inspection Procedures

Next, outlines of image inspection procedures are described with reference to FIGS. 2 and 3.

When printing is performed by the printing device 200, proof printing for printing the first copy is first performed, and, if the result of the proof printing does not show any defect, the process moves on to actual printing. In a case where an image defect is detected at the time of proof printing, recovery reprinting is normally performed to confirm that the defect has been removed, and the process then moves on to actual printing. In a case where the image defect needs to be corrected more than once, recovery re-reprinting is further performed.

Figure 2:
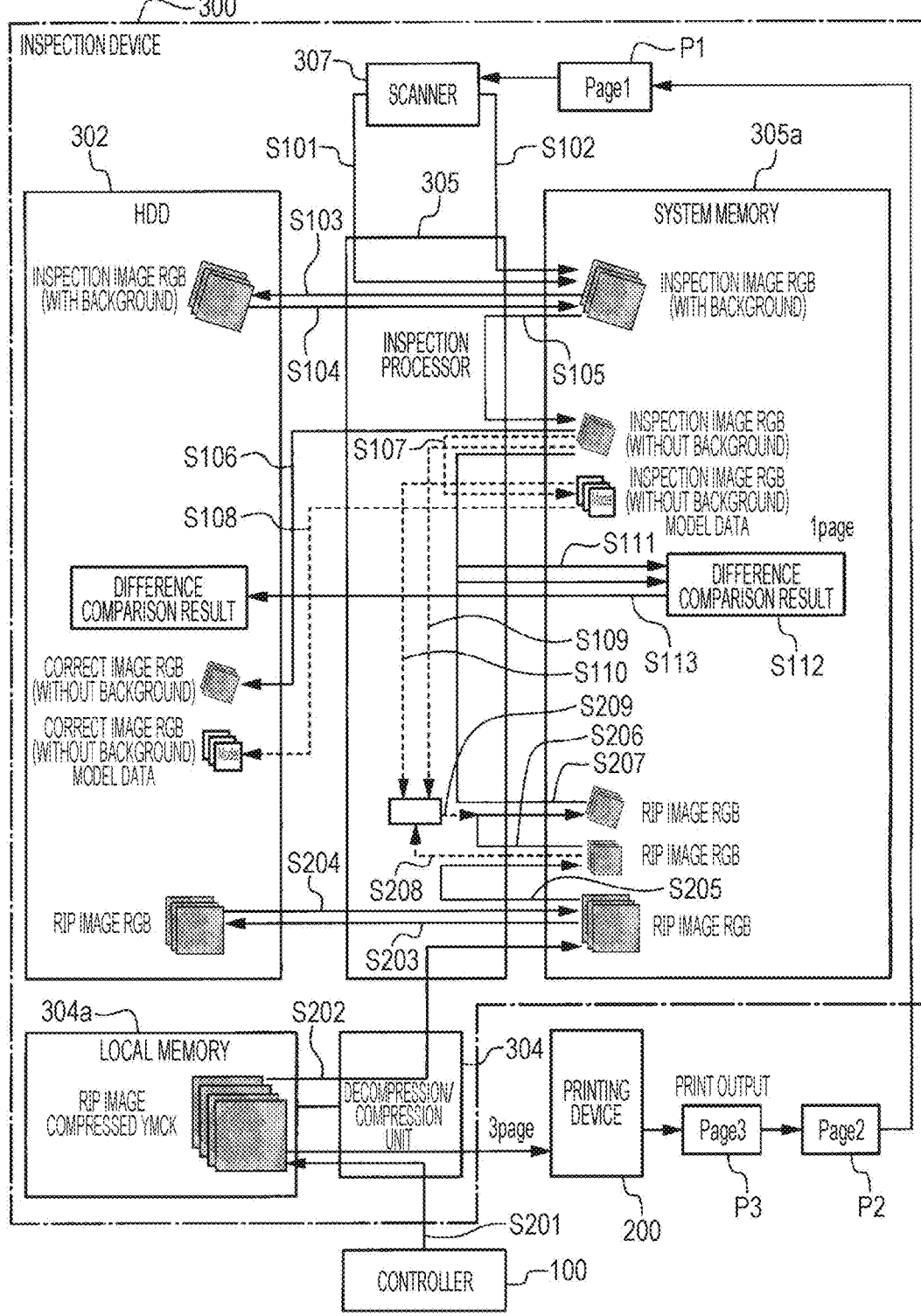
FIG. 2 is a diagram showing an outline of the flow in image inspection procedures (during proof printing) according to an embodiment of the present invention.

FIG. 2 shows an outline of the image inspection procedures at a time of proof printing. FIG. 3 shows an outline of the image inspection procedures at a time of recovery reprinting and actual printing.

Referring first to FIG. 2, an outline of proof printing is described. First, original image data (raster image processor (RIP) image data) that is transmitted from the controller 100 (on the lower side in FIG. 2) to the inspection device 300 and is designed for printing is decompressed by the decompression/compression unit 304 (step S201). In this step, compressed RIP image data (compressed YMCK data) is temporarily stored in a local memory 304a of the decompression/compression unit 304, and a decompression process and color conversion (YMCK→RGB) are performed. The decompressed RIP image data (RGB data) is then sent to the inspection processor 305, and the decompressed RIP image data (RGB data) is stored into a system memory 305a to be used by the inspection processor 305 at a time of inspection (step S202).

The RIP image data (RGB data) stored in the system memory 305a is saved into the HDD 302 (step S203), and the system memory 305a reads the saved data (step S204).

The RIP image data (RGB data) read into the system memory 305a is further subjected to resolution conversion by the inspection processor 305 (step S205), and alignment is performed (step S206). The inspection processor 305 reads the RIP image data stored in the system memory 305a (step S208), and acquires inspection image data (steps S109 and 110) that will be described later. The inspection processor 305 then compares the RIP image data with the inspection image data, and performs alignment (step S209).

An image formed on a paper sheet by the printing device 200 is read by the scanner 307 (the upper side in FIG. 2). Here, an image P1 of the first page, an image P2 of the second page, an image P3 of the third page are sequentially sent to the scanner 307. In a case where images are formed on both sides of a paper sheet, the inspection image data on each side is read by the scanner 307. The read image data of one side is transmitted to the system memory 305a connected to the inspection processor 305 (step S101). Likewise, the read image data of the other side is also transmitted to the system memory 305a (step S102). In the description below, the image data read by the scanner 307 will be referred to as the inspection image data.

The inspection image data (RGB data: with background) transmitted to the system memory 305a is saved into the HDD 302 (step S103), and is then read into the system memory 305a (step S104).

The inspection processor 305 then deletes the background of the inspection image data (RGB data: with background), performs resolution conversion, and stores the inspection image data (RGB data: without background) into the system memory 305a (step S105).

The inspection image data (RGB data: without background) subjected to the resolution conversion at the inspection processor 305 is also saved as the correct image into the HDD 302 (step S106).

The inspection processor 305 further generates model data from the inspection image data (RGB data: without background) (step S107). The generated model data (RGB data of the correct image: without background) is also saved into the HDD 302 (step S108).

Note that the inspection image data and the model data are read out at the time of alignment of the RIP image data in step S209 described above (steps S109 and 110).

The inspection processor 305 then reads the inspection image data (RGB data: without background) (step S111), and reads the RIP image data (RGB data) obtained in step S206 (step S207). The inspection processor 305 then performs an inspection process by comparing the inspection image data with the RIP image data, and stores the comparison result into the system memory 305a (step S112). The data of the comparison result is saved into the HDD 302 (step S113).

Figure 3:
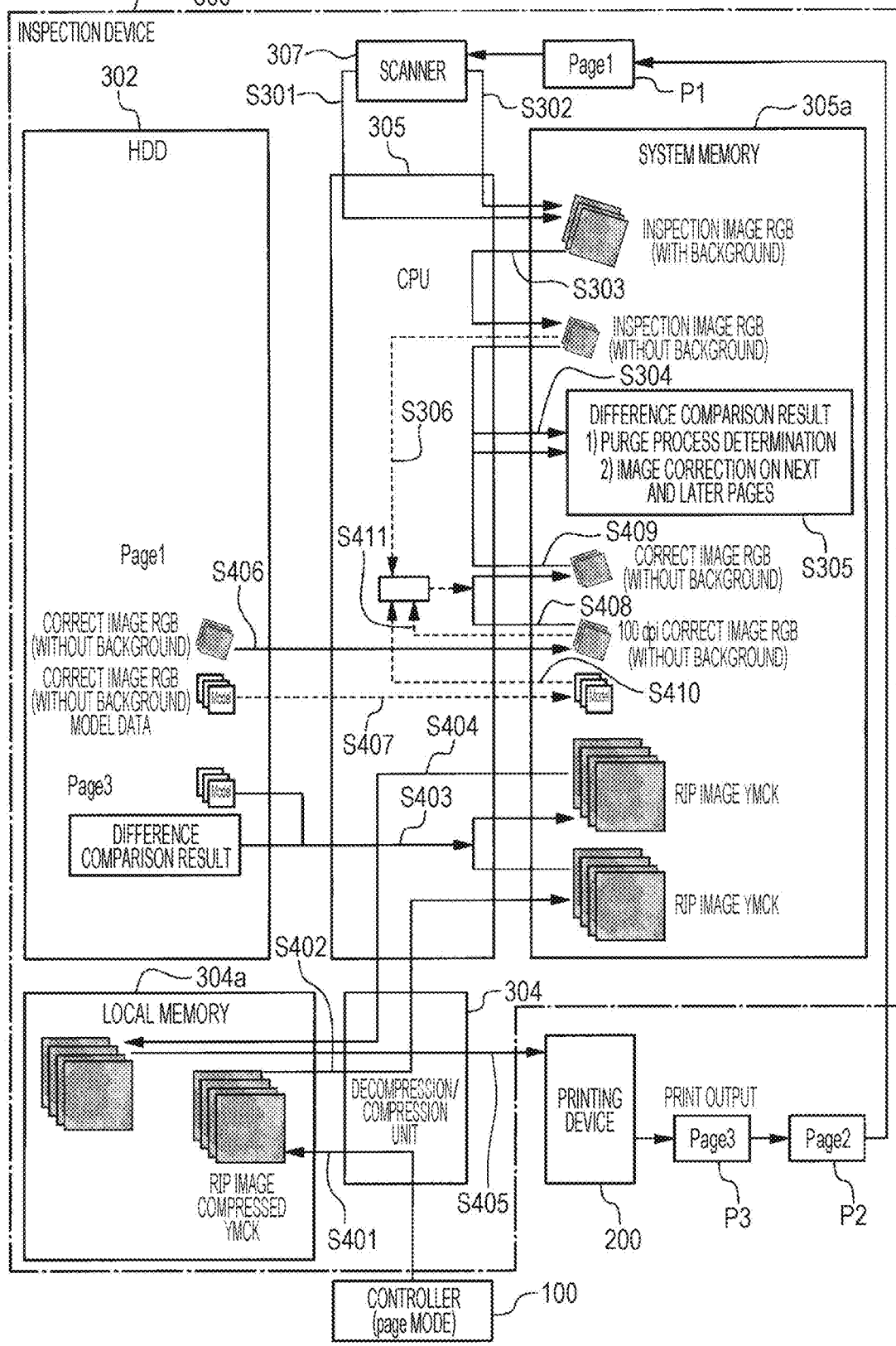
FIG. 3 is a diagram showing an outline of the flow in image inspection procedures (during recovery reprinting and actual printing) according to an embodiment of the present invention.

Referring now to FIG. 3, an outline of recovery reprinting and actual printing is described. First, the image data (RIP image data) of a print source transmitted from the controller 100 to the inspection device 300 is decompressed by the decompression/compression unit 304 (step S401). In this step, compressed RIP image data (compressed YMCK data) is temporarily stored into the local memory 304a of the decompression/compression unit 304, and is subjected to a decompression process. The decompressed RIP image data (YMCK data) is then sent to the inspection processor 305, and the decompressed RIP image data (YMCK data) is stored into the system memory 305a to be used by the inspection processor 305 at a time of inspection (step S402).

The RIP image data (YMCK data) stored in the system memory 305a is subjected to image correction by the inspection processor 305 as necessary (step S403), and the RIP image data (YMCK data) subjected to the image correction is temporarily stored into the local memory 304a of the decompression/compression unit 304 (step S404). The RIP image data (YMCK data) that has been subjected to the image correction and is temporarily stored in the local memory 304a is compressed by the decompression/compression unit 304, and is then supplied to the printing device 200, which performs printing on a paper sheet (step S405).

The image formed on the paper sheet by the printing device 200 is read by the scanner 307. Here, the image P1 of the first page, the image P2 of the second page, and the image P3 of the third page are sequentially sent to the scanner 307, and are then read. The read inspection image data of one side is transmitted to the system memory 305a connected to the inspection processor 305 (step S301). Likewise, the read inspection image data of the other side is also transmitted to the system memory 305a (step S302).

The background is deleted from the inspection image data (RGB data: with background) transmitted to the system memory 305a, and resolution conversion is performed (step S303). Meanwhile, the correct image data (RGB data: without background) and the model data (RGB data: without background) stored at the time of proof printing by the HDD 302 are read into the system memory 305a (steps S406 and S407). Here, the inspection processor 305 reads the correct image data (RGB data: without background) and the model data (steps S410 and 411), and reads the inspection image data (RGB data: without background) (step S306). The inspection processor 305 then performs alignment on the correct image data (step S409).

The inspection processor 305 then reads the inspection image data (RGB data: with background) obtained in step S303 (step S304), and outputs the correct image data (RGB data: without background) obtained in step S408 (Step S409). The inspection processor 305 then compares the inspection image data with the correct image data, to obtain a difference comparison result (step S305). The difference comparison result is stored into the system memory 305a.

In accordance with the difference comparison result, the CPU 301 determines the necessity of a purge process for discharging the paper sheet of the corresponding page onto a different catch tray (the sub catch tray 311) from usual, image correction on the next and later pages, and the like.

Note that the image inspection procedures at the time of recovery reprinting and actual printing shown in FIG. 3 are carried out in a case where the exact same image as that at the time of proof printing (at the time of printing of the first copy) is to be formed on paper sheets. At a time of variable printing that is performed to form a different image for each copy, inspection is conducted through the procedures shown in FIG. 2 even at the time of actual printing. Variable printing is performed to print a different address or the like for each copy, for example.

3. Details of an Image Inspection Process

Next, a specific flow in an inspection process to be performed by the CPU 301 and the inspection processor 305 of the inspection device 300 is described.

Figure 4:
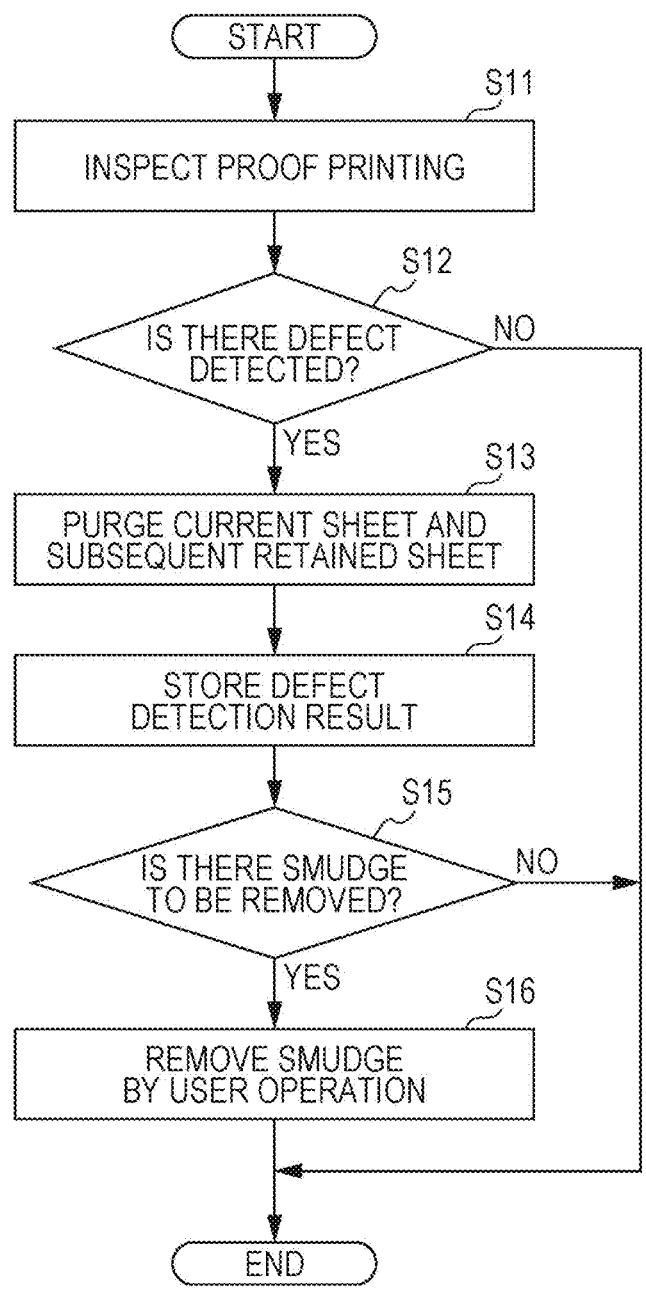
FIG. 4 is a flowchart showing an example of inspection at the time of proof printing according to an embodiment of the present invention.

FIG. 4 is a flowchart showing the flow in an inspection process to be performed at the time of proof printing.

First, when the inspection at the time of proof printing is started (step S11), the inspection processor 305 compares RIP image data that is the image data of the print source with inspection image data read by the scanner 307, and determines whether an image defect has been detected (step S12). If any image defect is not detected (NO in step S12), the inspection processor 305 ends the inspection in the proof printing.

If an image defect is detected in step S12 (YES in step S12), the CPU 301 performs a purge process to discharge the paper sheet from which the defect has been detected and the subsequent retailed paper sheets onto the sub catch tray 311, which is different from the catch tray 310 that is normally used (step S13). After that, the CPU 301 saves the detection result showing the image defect into the HDD 302 (step S14).

The user who has issued a proof printing instruction then checks the paper sheets discharged in step S13, and determines whether it is necessary to remove any smudge (step S15). If it is necessary to remove a smudge from the RIP image data (YES in step S15), the controller 100 is used to perform a smudge removal process. If there is no need to remove any smudge (NO in step S15), the inspection processor 305 terminates the inspection in the proof printing.

Figure 5:
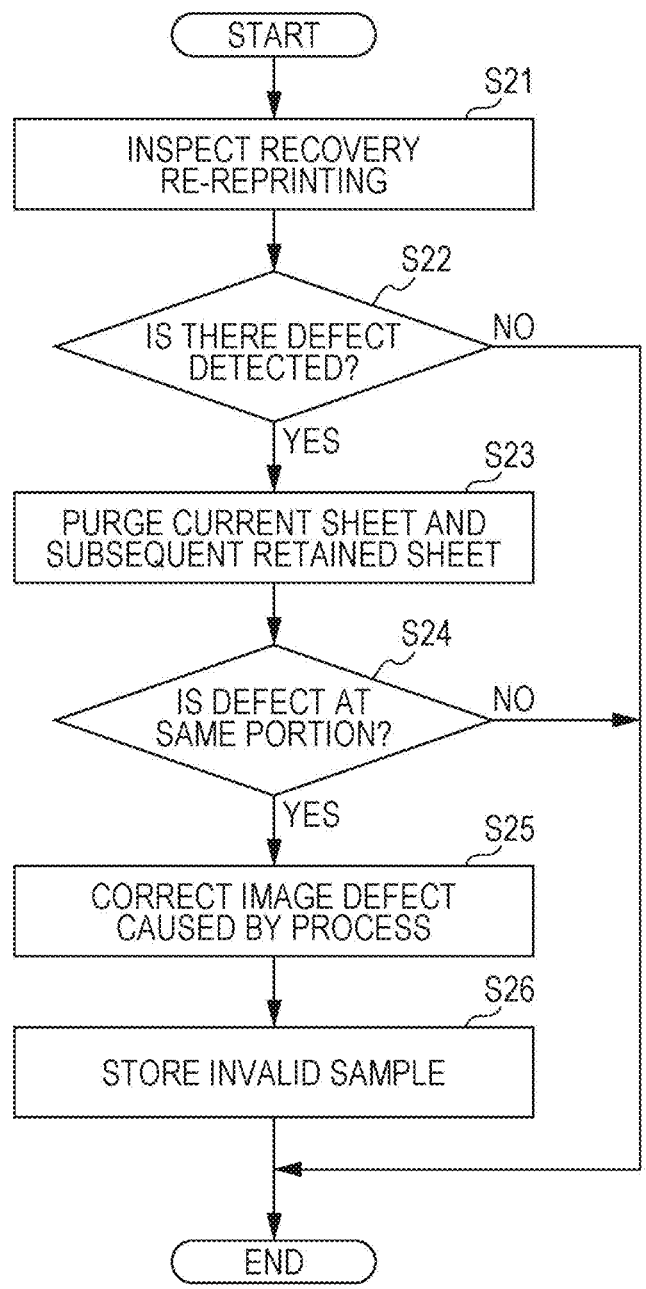
FIG. 5 is a flowchart showing an example of inspection at the time of recovery reprinting according to an embodiment of the present invention.

FIG. 5 is a flowchart showing the flow in an inspection process to be performed at a time of recovery reprinting. This recovery reprinting is performed in a case where a defect has been detected at the time of proof printing.

First, when the inspection at a time of recovery reprinting is started (step S21), the inspection processor 305 compares correct image data that is the image data of the print source with inspection image data read by the scanner 307 at the time of the recovery reprinting, and determines whether an image defect has been detected (step S22). If any image defect is not detected (NO in step S22), the inspection processor 305 ends the inspection in the recovery reprinting.

If an image defect is detected in step S22 (YES in step S22), the CPU 301 performs a purge process to discharge the paper sheet from which the defect has been detected and the subsequent retained paper sheets onto the sub catch tray 311, which is different from the catch tray 310 that is normally used (step S23). After that, the inspection processor 305 determines whether the portion at which the defect has been detected is the same as the portion during the proof printing (step S24). If the portions are determined not to be the same (NO in step S24), the inspection process comes to an end without any image correction during the recovery printing.

If it is determined in step S24 that an image defect has been detected at the same portion (YES in step S24), the inspection processor 305 determines that there is an image defect due to the image forming process in the printing device 200, and performs an image defect correction process to correct the image data for printing (step S25). Specific examples of the image defect correction process to be performed in this step will be described later with reference to FIGS. 7A and 7B and the later drawings.

The inspection processor 305 then saves the image data (a set of the RIP image data and the inspection image data) having a defect at the same portion, as an improper sample into the HDD 302 (step S26). An improper sample is saved as training data for samples in cases where correction is inappropriate. After saving the improper sample, the inspection processor 305 ends the inspection in the recovery reprinting.

Figure 6:
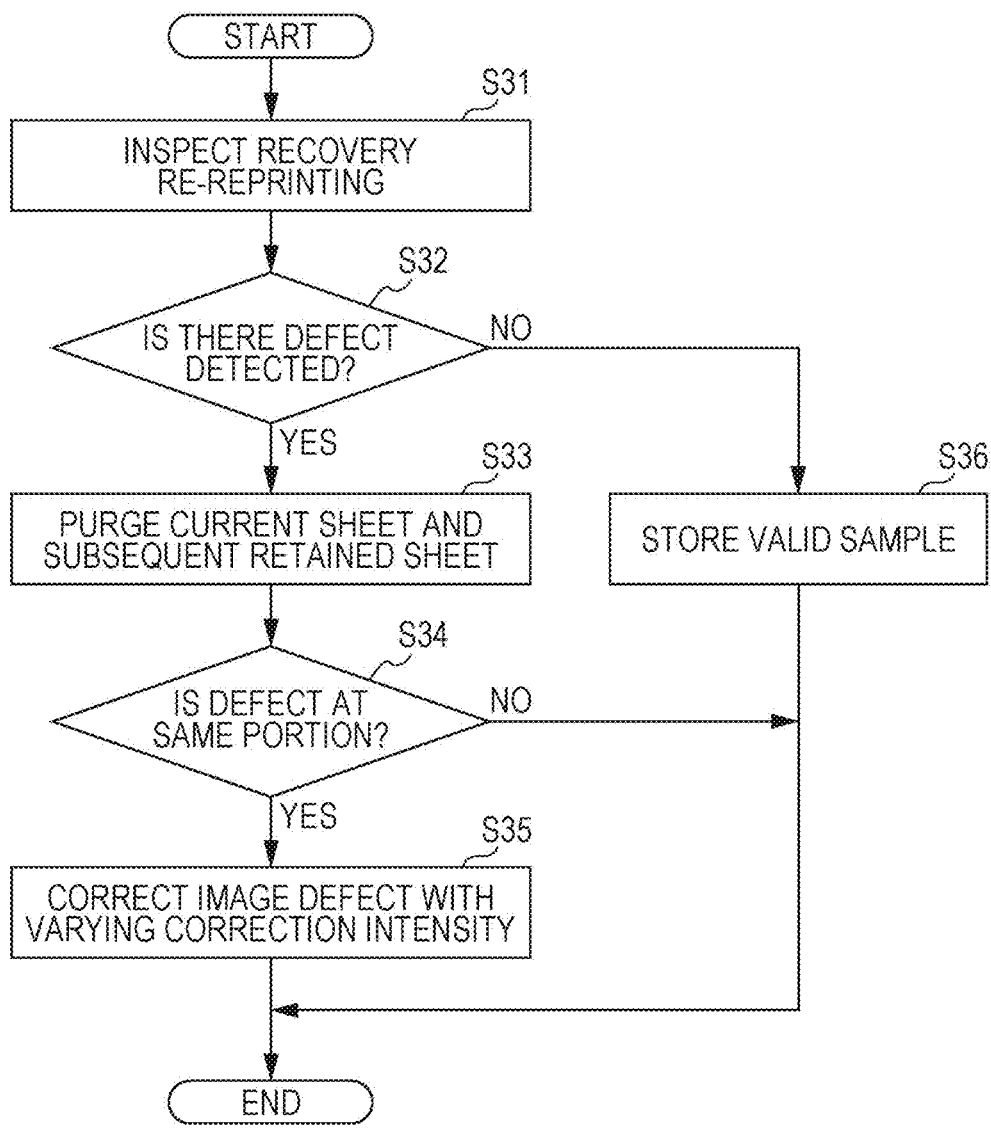
FIG. 6 is a flowchart showing an example of inspection at the time of recovery re-reprinting according to an embodiment of the present invention.

FIG. 6 is a flowchart showing the flow in an inspection process to be performed at a time of recovery re-reprinting. This recovery re-reprinting is performed in a case where a defect has been detected at the time of recovery reprinting.

First, when the inspection at the time of recovery re-reprinting is started (step S31), the inspection processor 305 compares correct image data that is the image data of the print source with inspection image data read by the scanner 307, and determines whether an image defect has been detected (step S32). If any image defect is not detected (NO in step S32), the inspection processor 305 causes the HDD 302 to save the image data (a set of the RIP image data and the inspection image data) as a proper sample (step S26). A proper sample is to be stored as training data for samples in cases where correction is appropriate. After saving the proper sample, the inspection processor 305 ends the inspection in the recovery re-reprinting.

If an image defect is detected in step S32 (YES in step S32), the CPU 301 performs a purge process to discharge the paper sheet from which the defect has been detected and the subsequent retained paper sheets onto the sub catch tray 311, which is different from the catch tray 310 that is normally used (step S33). After that, the inspection processor 305 determines whether the portion at which the defect has been detected is the same as the portion during the proof printing (or during the recovery reprinting) (step S34). If the portions are determined not to be the same (NO in step S34), the inspection process comes to an end without any image correction during the recovery re-reprinting.

If it is determined in step S34 that an image defect has been detected at the same portion (YES in step S34), the inspection processor 305 determines that there is still an image defect due to the image forming process in the printing device 200, and performs an image defect correction process to correct the image data for printing, with a different correction intensity from that used during the recovery reprinting (step S35).

The inspection processor 305 then ends the inspection in the recovery re-reprinting.

Next, example states in which the inspection processor 305 detects an image defect and examples of image correction based on the defect detection are described with reference to FIGS. 7A through 12C.

Figure 7A:
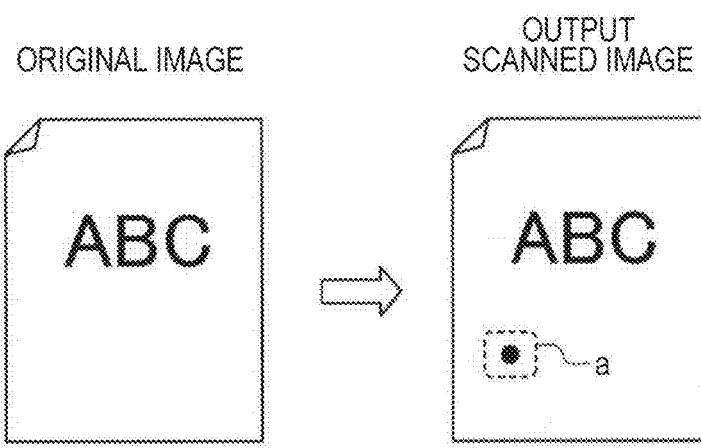
FIGS. 7A and 7B are diagrams showing comparative examples at a time of proof printing according to an embodiment of the present invention.
Figure 7B:
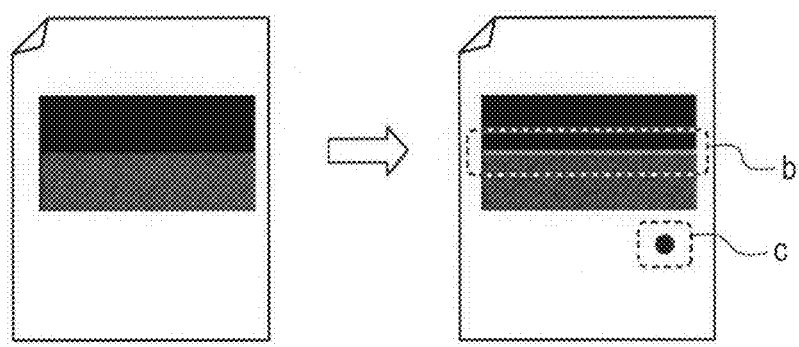

FIGS. 7A and 7B show examples in which the inspection processor 305 compares an original image with a scanned image, to detect a difference.

FIG. 7A shows an example in which an image defect is detected through detection of a difference portion a between an original image and a scanned image. This difference portion a is a smudge in a relatively small region.

FIG. 7B shows an example in which an image defect is detected through detection of difference portions b and c between an original image and a scanned image. The difference portion b is a relatively large region, and it can be seen from the state of the image in the region that the portion in which the tone of the image changes has not been properly formed. The difference portion c is a smudge in a relatively small region.

Figure 8A:
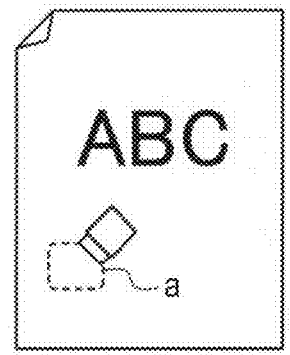
FIGS. 8A and 8B are diagrams showing example processes at a time of proof printing according to an embodiment of the present invention.

In a case where an image defect as shown in FIG. 7A or 7B is detected at the time of proof printing, a smudge in a small region like the difference portion a in FIG. 7A is removed through a smudge removal process in a user operation performed on the screen with the controller 100, as shown in FIG. 8A. This smudge removal process is performed in step S16 in the flowchart shown in FIG. 4. In a case where the user determines that the smudge is just a temporary one, it is not necessary to correct the image data through such a smudge removal process.

Figure 8B:
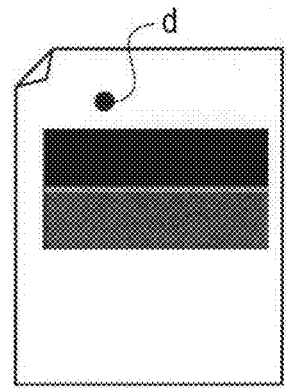

In a case where the image defect cannot be removed through smudge removal like the differential portion b shown in FIG. 7B, on the other hand, recovery reprinting is performed as shown in FIG. 8B. In the example shown in FIG. 8B, a smudge portion d appears in yet another region due to the recovery reprinting.

When recovery reprinting is performed, the inspection processor 305 inspects a scammed image of the paper sheet subjected to the recovery reprinting. The inspection processor 305 determines whether there is a defect at the same portion, by comparing an image defect detection result at the time of proof printing with an image defect detection result at the time of recovery reprinting.

Figure 9:
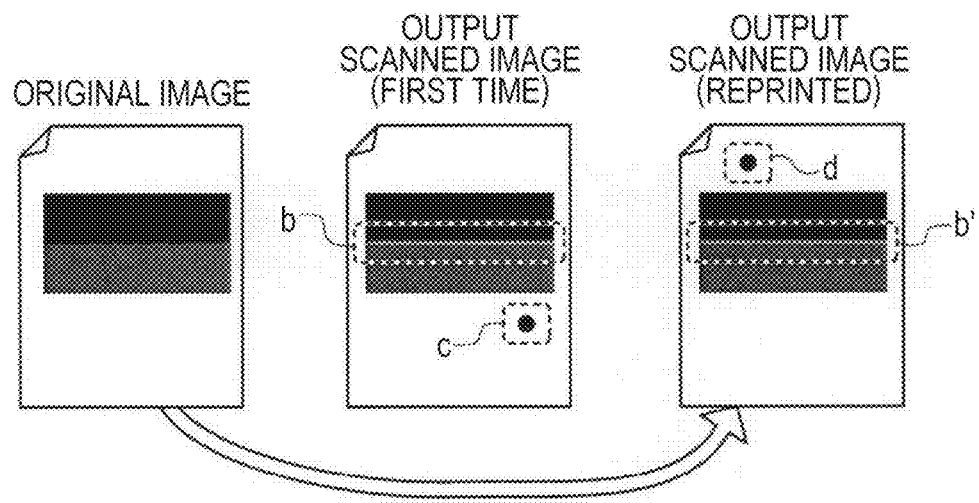
FIG. 9 is a diagram showing an example process at a time of reprinting according to an embodiment of the present invention.

Specifically, as shown in FIG. 9, after the difference portion b is detected through comparison between the original image and the scanned image at the time of proof printing, the same difference portion b' is also detected through comparison between the original image and the scammed image at the time of recovery reprinting. Because defects have appeared at the same portions b and b' at this stage, the inspection processor 305 determines that a reproducible image defect has appeared. On the other hand, the difference portion c at the time of proof printing and the difference portion d at the time of recovery reprinting are not the same portions, and therefore, the inspection processor 305 determines that the defects at the these portions are random image defects with no reproducibility.

When a reproducible image defect appears as described above, the inspection device 300 of this example corrects the original image data and removes the image defect.

Figure 10:
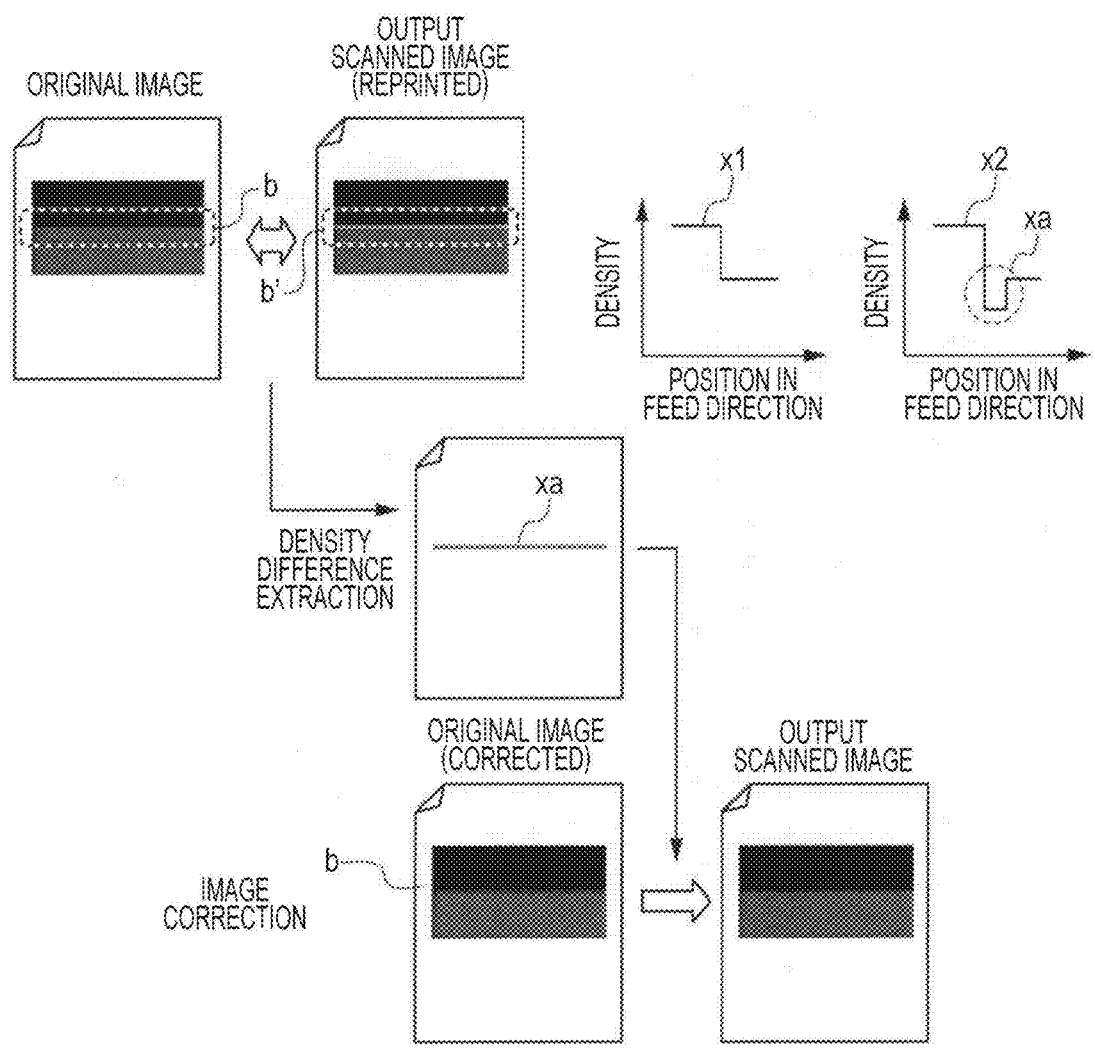
FIG. 10 is a diagram showing an example of image correction according to an embodiment of the present invention.

FIG. 10 shows an example in which a reproducible image defect is to be removed through correction. FIG. 10 shows a case where defects have appeared at the same portions b and b' as described above with reference to FIG. 9.

First, the CPU 301 of the inspection device 300 compares the original image with a scanned image at the time of recovery reprinting, to extract a density difference xa between the original image data and the scanned image data at the time of recovery reprinting at the defect appearance portions b and b'. The density difference xa can be obtained from a difference between the density change x 1 in the original image data and the density change x 2 in the scanned image data.

The CPU 301 then adds correction data to the defect appearance portion b in the original image data so that the density difference xa disappears. In this manner, the image defect is removed. If the amount of the correction data at this stage is appropriate, any defect will not be detected from the portion b in a scanned image at the time of recovery re-reprinting. The original image data corrected by the processing in the recovery re-reprinting as described above is registered as a proof image for printing, and is used in the actual printing.

By performing correction in this manner, the inspection device 300 of this example detects a reproducible image defect, and properly corrects the image defect. That is, at the time of actual printing in which the second copy is printed, it is possible to perform printing using the image data registered as a proof image, without any reproducible image defect.

In the example case shown in FIG. 10, an appropriate correction amount can be obtained through one correction operation. However, it is also possible to obtain an appropriately corrected state by changing the correction intensity in a stepwise manner.

Figure 11A:
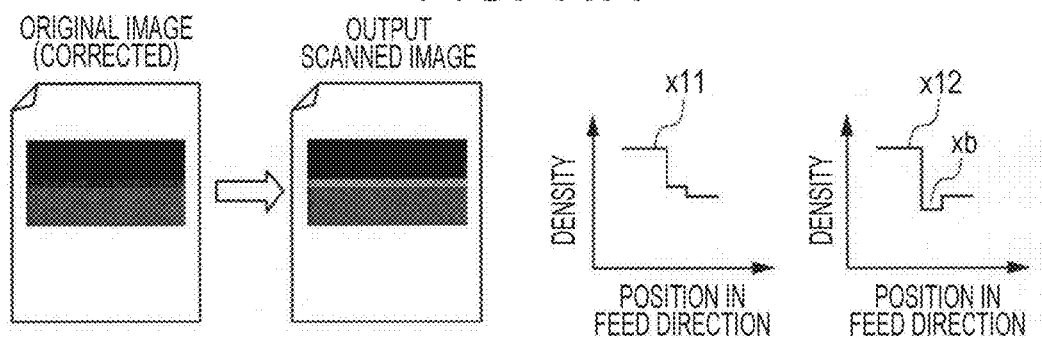
FIGS. 11A through 11C are diagrams showing another example of image correction (an example of stepwise correction) according to an embodiment of the present invention.
Figure 11B:
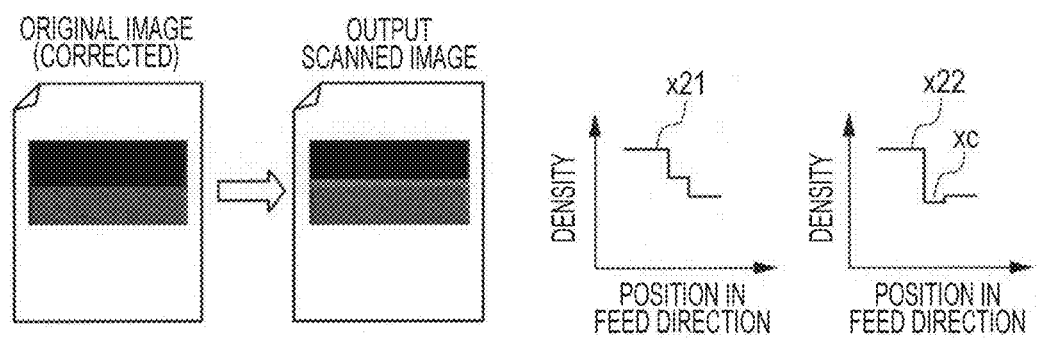

Specifically, as shown in FIG. 11A, when a density difference xb is still detected as a result of comparison between the density change x 11 in the corrected original image data and the density change x 12 in a scanned image, correction is performed with a changed correction intensity (correction amount) as shown in FIG. 11B. The density change x 21 in the corrected original image data is then compared with the density change x 22 in the scanned image.

Figure 11C:
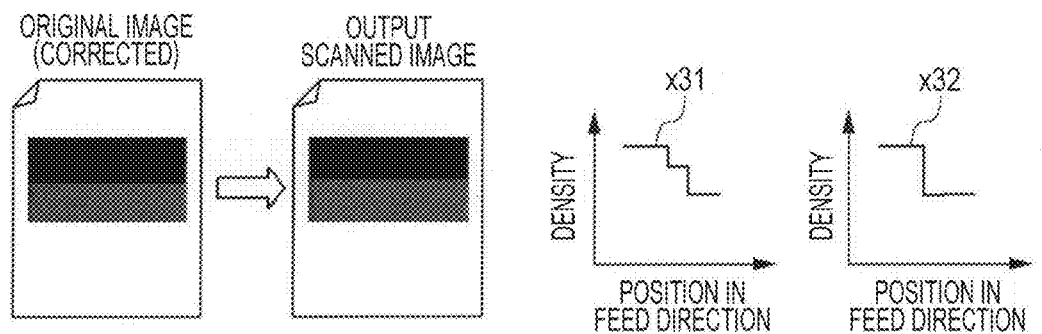

In a case where a density difference xc is detected, as shown in FIG. 11C, correction is performed with a further changed correction intensity (correction amount), and printing is then performed. The density change x 31 in the corrected original image data is then compared with the density change x 32 in the scanned image.

As correction is performed two or more times with a changed correction amount, a reproducible image defect can be appropriately corrected.

The results of stepwise correction as shown in FIGS. 11A through 11C are saved as training data for samples in cases where correction is appropriate, and the scanned image at the time of defect detection and the original image are also saved as training data for samples. As a result, the CPU 301 of the inspection device 300 can obtain an appropriate correction amount by performing an appropriate correction amount acquisition operation once through machine learning.

In a case where this machine learning is performed, the inspection device 300 may predict a portion at which an image defect will appear, and correct the portion, before inspecting a scanned image.

4. Modifications

Although more than one copy is printed using the same image data in the above described embodiment, the present invention can also be applied to variable printing in which the contents of part of the image change for each copy.

That is, at a time of variable printing, if defects at the same portion are detected through inspection in reprinting, a process to perform image correction on the defect appearance portion is performed in each printing process during re-reprinting.

The reproducible image defects shown in FIGS. 7A through 11C are mere examples, and tins embodiment can cope with various image defects having various degrees of reproducibility.

Figure 12A:
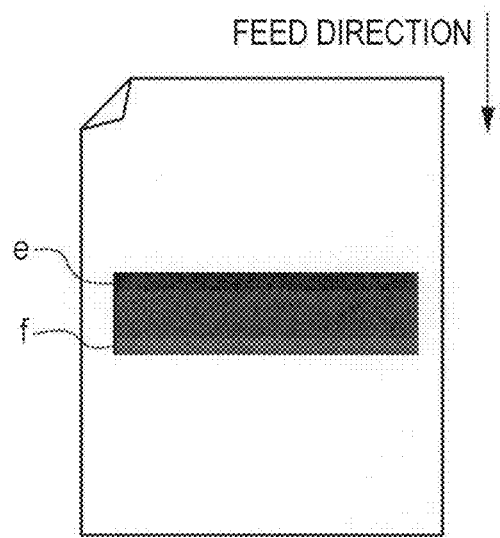
FIGS. 12A through 12C are diagrams showing examples of image defects with high reproducibility.

For example, when there is a dark region in an image as shown in FIG. 12A, the inspection device 300 of this embodiment can correct a reproducible defect, such as a blurred top edge f of the dark region, or a blurred rear edge e of the dark region.

Figure 12B:
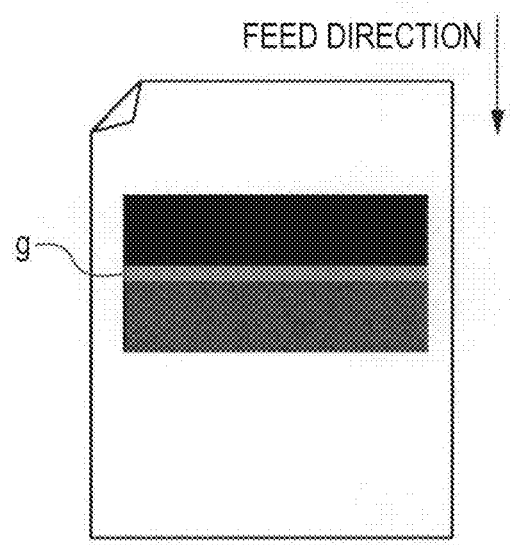

Also, as shown in FIG. 12B, the inspection device 300 according to this embodiment can also correct a reproducible defect in which a portion g in a dark region has become white.

Figure 12C:
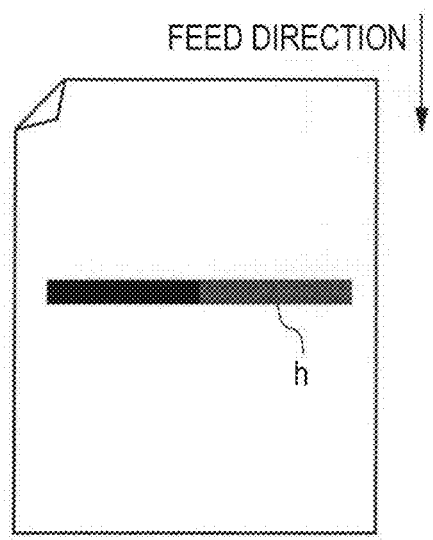

Further, as shown in FIG. 12C, the inspection device 300 of this embodiment can also correct a reproducible defect in which a region in with varied densities appears in a direction (the main scanning direction) perpendicular to the feed direction.

In the configuration shown in FIG. 1, the printing device 200 and the inspection device 300 are separate devices. However the inspection device 300 may be incorporated into the printing device 200.

Further, the control functions including the CPUs 201 and 301 of the printing device 200 and the inspection device 300 may be formed with a computer device connected to (or built in) the printing device 200 or the inspection device 300, and the program for performing the processing procedures described in the embodiment may be implemented in the computer device.

According to an embodiment of the present invention, it is possible to obtain a correct image by performing image correction on a highly reproducible image defect that appears under certain conditions. Thus, the trouble and the costs required for correcting highly reproducible image defects can be avoided.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
   an input part that acquires image data for an image forming part to form an image on a paper sheet;
   an image reader disposed along a conveyance path for the paper sheet on which the image is formed by the image forming part to read the image formed on the paper sheet; and
   an inspection processor that conducts inspection by comparing the acquired image data with the image read by the image reader,
   wherein, when a defect is detected in a portion of the image read by the image reader, and another defect is detected at the same portion in an image read by the image reader from another paper sheet subjected to recovery reprinting by the image forming part, the inspection processor performs image correction on a defect at the portion in the acquired image data for recovery re-reprinting by the image forming part.

2. The image processing apparatus according to claim 1, wherein
   the paper sheet from which a defect is detected in the image by the inspection processor, and a subsequent retained paper sheet in the apparatus are discharged onto a different tray from a regular catch tray, and,
   at times of recovery reprinting and re-reprinting, reprinting is performed starting from a page from which a defect is detected in the image by the inspection processor.

3. The image processing apparatus according to claim 2, wherein the recovery reprinting is reprinting for a user to check a proofing operation.

4. The image processing apparatus according to claim 1, wherein, when a defect at a different portion is detected from an image read by the image reader from a paper sheet subjected to the recovery reprinting, the defect at the different portion is regarded as a defect due to a random smudge that has appeared unexpectedly, and correction based on the random smudge is not performed on the image data for recovery re-reprinting.

5. The image processing apparatus according to claim 1, wherein, in correction of a defect in the image data for recovery re-reprinting, correction intensity is changed in a stepwise manner.

6. The image processing apparatus according to claim 5, wherein, when the correction intensity is changed in a stepwise manner, the acquired image data and the image read by the image reader at a time when the inspection processor detects a defect are saved as training data for a sample in a case where correction is inappropriate.

7. The image processing apparatus according to claim 5, wherein, when the correction intensity is changed in a stepwise manner, the acquired image data and the image read by the image reader at a time when the inspection processor detects no defects are saved as training data for a sample in a case where correction is appropriate.

8. The image processing apparatus according to claim 6, wherein correction is performed on a portion at which image defect appearance is predicted, through machine learning using the training data.

9. The image processing apparatus according to claim 1, wherein, when the image forming part performs image formation for a plurality of copies, the image forming part performs image formation for a second and later copies, using image data in which an image defect portion identified in a first copy has been corrected.

10. An image processing method comprising:

acquiring image data to form an image on a paper sheet;

reading the image in a conveyance path for the paper sheet on which the image is formed;

conducting an inspection process by comparing the acquired image data with the read image; and when a defect is detected in a portion of the image read, and another defect is detected at the same portion in another paper sheet that was subjected to recovery reprinting after the defect was detected in the read image during the inspection process, performing image correction at the portion in the acquired image data.

11. A non-transitory computer readable recording medium storing a computer readable program for causing a computer to perform:

acquiring image data to form an image on a paper sheet;

reading the image in a conveyance path for the paper sheet on which the image is formed;

conducting an inspection process by comparing the acquired image data with the read image; and when a defect is detected in a portion of the image read, and another defect is detected at the same portion in another paper sheet that was subjected to recovery reprinting after the defect was detected in the read image during the inspection process, performing image correction at the portion in the acquired image data.

* * * * *